United States Patent [19]

Dey et al.

[11] 4,372,792
[45] Feb. 8, 1983

[54] MANUFACTURE OF A FLEXIBLE STRANDED OPTICAL FIBER BODY

[75] Inventors: Philip Dey, New Barnet; Bernard Gaylard, Hale; David A. Taylor, Kenton, all of England

[73] Assignee: BICC Limited, London, England

[21] Appl. No.: 311,558

[22] Filed: Oct. 15, 1981

[51] Int. Cl.³ .................. H01B 13/06; G02B 5/16
[52] U.S. Cl. .................................. 156/48; 156/54; 156/56; 156/172; 156/201; 156/287; 156/428; 156/429; 156/430; 156/431; 156/461; 350/96.23; 350/96.29; 350/96.32; 350/96.33; 350/96.34; 350/320; 428/375; 428/377; 428/379
[58] Field of Search ............ 65/3 C; 156/48, 54, 156/56, 172, 201, 285, 287, 381, 382, 428, 429, 430, 431, 461; 350/96.1, 96.23, 96.30, 96.29, 96.32, 96.33, 96.34, 320; 358/901; 428/375, 377, 379

[56] References Cited

U.S. PATENT DOCUMENTS

| | | | |
|---|---|---|---|
| 3,297,819 | 1/1967 | Wetmore | 156/48 X |
| 3,733,225 | 5/1973 | Moody | 156/48 |
| 3,876,487 | 4/1975 | Garrett et al. | 156/48 X |
| 3,888,710 | 6/1975 | Burk | 156/48 |
| 4,072,400 | 2/1978 | Claypoole et al. | 350/96.30 |
| 4,123,304 | 10/1978 | Gaudette | 156/48 |
| 4,183,621 | 1/1980 | Kao et al. | 350/96.33 X |
| 4,334,733 | 6/1982 | Takeshima et al. | 350/96.33 |

FOREIGN PATENT DOCUMENTS 1598438  9/1981  United Kingdom.

*Primary Examiner*—Robert A. Dawson
*Attorney, Agent, or Firm*—Buell, Blenko, Ziesenheim & Beck

[57] ABSTRACT

An overhead electric conductor with optical fibres loosely housed in the bore of a central core, which bore also contains a greasy water-impermeable medium 4, is manufactured by causing a preformed elongate metal member of U-shaped transverse cross-section and the optical fibres to advance in the direction of their lengths, the rate of advance of the fibres being restrained. As the U-shaped elongate member is transversely folded around the optical fibres greasy water-impermeable medium is injected into the bore of the elongate metal member under a controlled pressure. The consistency of the greasy water-impermeable medium the pressure and rate at which it is injected into the bore and the degree of restraint imparted to the optical fibres 3 is such that, in a predetermined length of the conductor, the length of the optical fibres exceeds the length of the bore by a controlled extent, preferably 1 to 3%.

19 Claims, 2 Drawing Figures

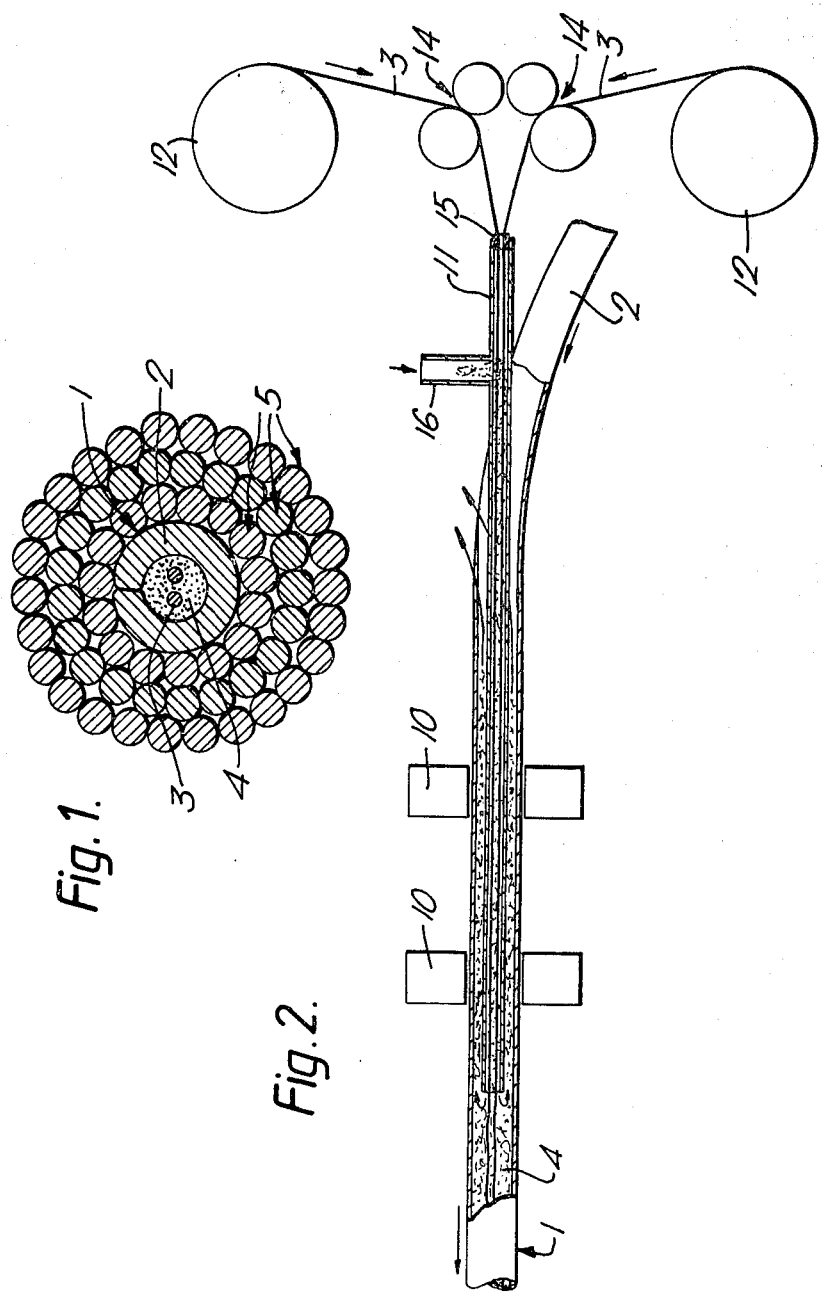

MANUFACTURE OF A FLEXIBLE STRANDED OPTICAL FIBER BODY

This invention relates to flexible stranded bodies of the kind which comprise a plurality of helically wound bare elongate elements of metal or metal alloy and which are adapted to be freely supported from spaced supports in long lengths. The invention is especially, but not exclusively, concerned with overhead electric conductors of the kind which comprise one or more than one layer of helically wound bare elongate elements of electrically conductive metal or metal alloy but it is to be understood that the invention does not exclude flexible stranded bodies not normally intended to carry electric current, for instance stranded wire ropes.

In the Complete Specification of our British Pat. No. 1598438 there is described and claimed a flexible stranded body which includes at least one optical waveguide for use in the communications field adapted for transmission of light and which comprises at least one layer of helically wound bare elongate elements of metal or metal alloy, at least one elongate compartment within and extending throughout the length of the stranded body and, loosely housed in the elongate compartment or in at least one of the elongate compartments, at least one separate optical fibre and/or at least one optical bundle, as defined in the aforesaid Complete Specification.

One form of flexible stranded body lying within the scope of the aforesaid British patent comprises a substantially circumferentially rigid central core of metal or metal alloy having an elongate compartment within and extending throughout the length of the core; at least one optical fibre loosely housed in, and of a length substantially greater than that of, the elongate compartment; and, surrounding the central core, at least one layer of helically wound bare elongate elements of metal or metal alloy. Such a flexible stranded body will hereinafter, for convenience, be referred to as "a flexible stranded body of the kind described".

By virtue of being housed loosely in the elongate compartment of a flexible stranded body of the kind described, limited relative movement between the or each optical fibre and the stranded body can take place when the stranded body vibrates, oscillates or is otherwise flexed, as may, for example, occur in the case when an overhead electric conductor or other freely supported flexible stranded body is subjected to winds. Limited relative movement between the or each optical fibre and the stranded body can also occur when the stranded body is subjected to a changing tensile load during and after its installation due to forces imposed on it by winches and brakes, etc, which are used in tensioning the stranded body to obtain a predetermined sagging condition; after installation, changes in tensile load in a stranded body can also occur due to changes in external loading and in temperature. Limited relative movement between the or each optical fibre and the stranded body can also occur whilst the stranded body is in service and creep gives rise to non-elastic extension of the stranded body.

It is an object of the present invention to provide an improved method of manufacturing a flexible stranded body of the kind described.

According to the invention, the improved method comprises causing a preformed elongate member of metal or metal alloy of approximately U-shaped transverse cross-section to travel in the direction of its length; feeding into the space bounded by the U-shaped elongate member at least one optical fibre in such a way that the rate of advance of the or each fibre is restrained; transversely folding or otherwise shaping the advancing U-shaped elongate member in such a way as to form a substantially circumferentially rigid central core having a closed elongate compartment within and extending throughout the length of the core in which the or each advancing optical fibre is loosely housed; injecting a water-impermeable medium of a grease-like nature into the elongate compartment under a controlled pressure, the consistency of the greasy water-impermeable medium, the pressure and rate at which it is injected into the compartment and the degree of restraint imparted to the or each advancing optical fibre being such that, in a predetermined length of the stranded body, the length of the or each optical fibre exceeds the length of the elongate compartment by a controlled extent and the space within the elongate compartment not occupied by the or each optical fibre is substantially filled with water-impermeable medium in a greasy state; and applying around the central core so formed at least one layer of helically wound bare elongate elements of metal or metal alloy.

Preferably, the consistency of the greasy water-impermeable medium, the pressure and rate at which it is injected into the elongate compartment and the degree of restraint imparted to the or each advancing optical fibre are such that, in a predetermined length of the stranded body, the length of the or each optical fibre exceeds the length of the elongate compartment by a controlled amount lying in the range 1 to 3 percent.

Application of one or more than one layer of helically wound bare elongate elements of metal or metal alloy around the central core may be effected in tandem with the operation of forming the central core or it may be effected as a separate operation or separate operations. Feeding of the or each advancing optical fibre into the space bounded by the U-shaped elongate member and injection of greasy water-impermeable medium into the elongate compartment are preferably effected using at least one substantially rigid tube having an external diameter which is less than the internal diameter of the elongate compartment, which rigid tube is positioned in the space bounded by the U-shaped elongate member and extends beyond the means by which the U-shaped elongate member is transversely folded or otherwise shaped to form the central core, the or each advancing optical fibre being fed into the upstream end of the rigid tube and greasy water-impermeable medium being injected through at least one port in the wall of the tube, excess water-impermeable medium flowing out of the downstream end of the tube and in an upstream direction between the U-shaped elongate member and the rigid tube and out of the U-shaped member. Preferably, excess greasy water-impermeable medium flowing out of the downstream end of the tube and in an upstream direction between the U-shaped elongate member and the tube and out of the U-shaped member is collected in a reservoir positioned beneath the U-shaped member. Greasy water-impermeable medium being injected through at least one port in the wall of the rigid tube, preferably is fed from a storage tank, the pressure and rate of flow of water-impermeable medium from the storage tank into the tube being manually or automatically controlled. The storage tank, rigid tube and reservoir positioned beneath the U-shaped member may form part of a circulatory system, water-impermeable medium collected in the reservoir from the U-shaped member being pumped back into the storage tank. Preferably, the pressure and rate at which greasy water-impermeable medium is injected into the rigid tube are such that water-impermeable medium, flowing towards the downstream end of the tube, draws the or each optical fibre along the tube and into the elongate compartment of the advancing U-shaped elongate member.

The rigid tube may have in its bore guide means for positioning a single optical fibre within the elongate compartment or two or more circumferentially spaced guide means for positioning two or more optical fibres in circumferentially spaced positions within the elongate compartment. The water-impermeable medium substantially filling the elongate compartment will serve to some extent to maintain a single optical fibre in the compartment spaced from the wall of the compartment or two or more optical fibres in the compartment circumferentially spaced with respect to one another although it will still permit relative movement between the optical fibres and the stranded body when required. The rigid tube may be caused to rotate about its longitudinal axis so that the optical fibres fed into the elongate compartment each follows a helical path, or the rigid tube may be caused to oscillate about its longitudinal axis so that the optical fibres being fed into the elongate compartment each follows a helical path whose direction of lay reverses at spaced positions along the length of the stranded body.

Where two or more substantially rigid tubes are positioned in the space bounded by the U-shaped elongate member, preferably they are arranged side-by-side in the form of an assembly and at least one optical fibre is fed through, and greasy water-impermeable medium is injected into, each tube. The assembly of tubes may be rotated or caused to oscillate about the longitudinal axis of the assembly.

The means for imparting restraint to the or each advancing optical fibre may take any convenient form, for example, a capstan or a pair of pinch rollers between which the optical fibre is caused to travel.

The preformed elongate member of metal or metal alloy of approximately U-shaped transverse cross-section is preferably an extrudate of aluminium or aluminium alloy but it may be a tape which has been preformed to approximately U-shaped transverse cross-section. In each case, after the elongate member has been transversely folded or otherwise shaped to form the central core, the abutting longitudinal edges of the elongate member may be welded or otherwise permanently secured together to close the elongate compartment. Preferably, in this case, the rigid tube will be arranged to extend downstream of the means for welding or otherwise securing the longitudinal edges of the elongate member together. If desired, before the or each layer of helically wound bare elongate elements of metal or metal alloy is applied to the central core, the central core may be fed into the space bounded by another advancing preformed elongate member of metal or metal alloy of approximately U-shaped transverse cross-section and said other elongate member transversely folded or otherwise shaped around the central core in such a way that its abutting longitudinally extending edges are circumferentially spaced with respect to the abutting longitudinally extending edges of the first elongate member.

In an alternative arrangement, the preformed elongate member of metal or metal alloy of approximately U-shaped transverse cross-section that is transversely folded or otherwise shaped to form the central core may be a tape which is transversely coiled to such an extent that it forms approximately two complete turns around the axis of the central core.

To provide for relative sliding movement between adjacent elongate elements of the layer or layers and to assist in preventing water from gaining access to the flexible stranded body and thereby reduce risk of corrosion of the elongate elements, the interstices between the elongate elements may be filled with a water-impermeable medium of a grease-like nature.

Although the or each optical fibre of a flexible stranded body manufactured by the method of the present invention is preferably separate and unsupported, in some circumstances it may be a component element of an optical bundle (by which is meant a group of optical fibres or a group of fibres including at least one optical fibre and at least one non-optical reinforcing fibre or other reinforcing elongate member) or it may be supported by a flexible elongate carrier member which is loosely housed in the elongate compartment so that the required limited relative movement between the optical fibre and flexible stranded body can take place.

The flexible elongate carrier member may be a single flexible tape to one surface of which the or each optical fibre is secured by adhesive; viewed in transverse cross-section the tape may be corrugated so that it has a plurality of troughs extending along its length, in each of some or all of which an optical fibre is secured. In another embodiment, the flexible elongate carrier member may consist of two flexible tapes, one overlying the other, the or each optical fibre being sandwiched between the two tapes and being secured by adhesive to at least one of the adjacent surfaces of the tapes; one or each of these two tapes may be transversely corrugated as described above. Where one or each of two flexible tapes is transversely corrugated, the two tapes may be so bonded together that the or each optical fibre is secured within the flexible elongate carrier member so formed but is capable of limited movement within the trough in which it lies. In a further embodiment, the flexible elongate carrier member may comprise a single tape of plastics material in which the or each optical fibre is wholly or partially embedded.

The invention also includes apparatus for use in the manufacture of a flexible stranded body of the kind described by the improved method as hereinbefore described.

The flexible stranded body manufactured by the method of the present invention is especially suitable for use as an earth conductor of an overhead electric transmission line and, because it may be manufactured to have the same or approximately the same properties of sag and tension as those of conventional overhead conductors of substantially the same overall diameter, it provides the important advantage that the flexible stranded body can be used to replace an earth conductor or other overhead electric conductor of an existing overhead electric transmission system thereby to provide a communication means in the system. Thus, the invention provides a relatively inexpensive communications link between stations, substations and other locations along an electric transmission system.

Accordingly, the invention also includes an overhead electric transmission or distribution system which includes at least one overhead stranded conductor manufactured by the method as hereinbefore described.

Where the overhead stranded conductor manufactured by the method as hereinbefore described is an earth conductor of the system, the earth conductor may be suspended between the tops of towers or other supporting structures or it may be supported between the towers or other supporting structures at positions below the cross-arms of the towers.

The invention is further illustrated by a description, by way of example, of the preferred method of manufacturing an overhead stranded conductor incorporating two optical fibres, with reference to the accompanying drawing, in which:

FIG. 1 is a transverse cross-sectional view of the overhead stranded conductor, and FIG. 2 is a fragmental diagrammatic representation of the method of manufacture of the overhead stranded conductor shown in FIG. 1.

Referring to the drawing, the overhead stranded conductor shown in FIG. 1 comprises a central core 1 constituted by a single elongate tubular member 2 of aluminium-based alloy, two optical fibres 3 loosely housed in, and of a length approximately 3% greater than that of, the bore of the elongate member, and, filling the space within the bore not occupied by the optical fibres, water-impermeable medium 4 in a greasy state. The central core 1 is surrounded by three layers 5 of helically wound round wires of aluminium-based alloy, the directions of lay of adjacent layers being of opposite hand.

In the method of manufacture as shown in FIG. 2, a preformed elongate member 2 of aluminium-based alloy of approximately U-shaped transverse cross-section is caused to travel in the direction of its length towards two longitudinally spaced folding dies 10. Positioned axially in the space bounded by the U-shaped elongate member 2 and extending beyond the folding dies 10 is a rigid tube 11 having an external diameter which is less than the internal diameter of the central core 1 formed by folding the U-shaped elongate member. Two optical fibres 3 are drawn from spools 12 through pinch rollers 14 and a sealing gland 15, which is positioned at the upstream end of the tube 11, into the tube, the pinch rollers imparting a degree of restraint to each advancing optical fibre. Water-impermeable medium 4 in a greasy state is fed into the rigid tube 11 through a port 16 near the upstream end of the tube, the pressure and rate at which the greasy water-impermeable medium is injected into the tube being such that water-impermeable medium, flowing towards the downstream end of the tube, draws optical fibres 3 along the tube and into the bore of the core 1. Excess water-impermeable medium flows out of the downstream end of the tube and in an upstream direction between the U-shaped elongate member 2 and the tube and out over the walls of the U-shaped elongate member. The pressure and rate at which water-impermeable medium 4 in a greasy state is into the rigid tube 11 and the degree of restraint imparted to each advancing optical fibre by the pinch rollers 14 are such that, in a predetermined length of the stranded conductor, each optical fibre exceeds the length of the bore of the central core 1 by approximately 3% and the space within bore not occupied by the optical fibres is substantially filled with water-impermeable medium in a greasy state. Three layers of helically wound round wires of aluminium alloy are formed around the central core 1, the directions of lay of adjacent layers being of opposite hand, the layers being applied either in tandem with the operation of forming the central core or as separate operations.

What we claim as our invention is:

1. A method of manufacturing a flexible stranded body comprising a substantially circumferentially rigid central core of metal or metal alloy having an elongate compartment within and extending throughout the length of the core, at least one optical fibre loosely housed in, and of a length substantially greater than that of, the elongate compartment, and, surrounding the central core, at least one layer of helically wound bare elongate elements of metal or metal alloy, which method comprises causing a preformed elongate member of metal or metal alloy of approximately U-shaped transverse cross-section to travel in the direction of its length; feeding into the space bounded by the U-shaped elongate member at least one optical fibre in such a way that the rate of advance of the fibre is restrained; transversely folding the advancing U-shaped elongate member in such a way as to form a substantially circumferentially rigid central core having a closed elongate compartment within and extending throughout the length of the core in which the advancing optical fibre is loosely housed; injecting water-impermeable medium of a grease-like nature into the elongate compartment under a controlled pressure, the consistency of the greasy water-impermeable medium, the pressure and rate at which it is injected into the compartment and the degree of restraint imparted to the advancing optical fibre being such that, in a predetermined length of the stranded body, the length of the optical fibre exceeds the length of the elongate compartment by a controlled extent and the space within the elongate compartment not occupied by the optical fibre is substantially filled with water-impermeable medium in a greasy state; and applying around the central core so formed at least one layer of helically wound bare elongate elements of metal or metal alloy.

2. A method as claimed in claim 1, wherein the consistency of the greasy water-impermeable medium, the pressure and rate at which it is injected into the elongate compartment and the degree of restraint imparted to the advancing optical fibre are such that, in a predetermined length of the stranded body, the length of the optical fibre exceeds the length of the elongate compartment by a controlled amount lying in the range 1 to 3%.

3. A method as claimed in claim 1, wherein application of at least one layer of helically wound bare elongate elements of metal or metal alloy around the central core is effected as a separate operation.

4. A method as claimed in claim 1, wherein at least one substantially rigid tube having an external diameter which is less than the internal diameter of the elongate compartment is positioned in the space bounded by the U-shaped elongate member and extends beyond means by which the U-shaped elongate member is transversely folded to form the central core, the advancing optical fibre is fed into the upstream end of the rigid tube and greasy water-impermeable medium is injected through a port in the wall of the tube, excess water-impermeable medium flowing out of the downstream end of the tube and in an upstream direction between the U-shaped elongate member and the rigid tube and out of the U-shaped member.

5. A method as claimed in claim 4, wherein the pressure and rate at which greasy water-impermeable medium is injected into the rigid tube are such that water-impermeable medium, flowing towards the downstream end of the tube, draws the optical fibre along the tube and into the elongate compartment of the advancing U-shaped elongate member.

6. A method as claimed in claim 4, wherein the rigid tube has in its bore at least two circumferentially spaced guide means for positioning at least two optical fibres in circumferentially spaced positions within the elongate compartment.

7. A method as claimed in claim 6, wherein the rigid tube is caused to rotate about its longitudinal axis so that each optical fibre fed into the elongate compartment follows a helical path.

8. A method as claimed in claim 6, wherein the rigid tube is caused to oscillate about its longitudinal axis so that each optical fibre being fed into the elongate compartment follows a helical path whose direction of lay reverses at spaced positions along the length of the stranded body.

9. A method as claimed in claim 1, wherein restraint is imparted to the advancing optical fibre by causing it to travel between a pair of pinch rollers.

10. A method as claimed in claim 1, wherein the preformed elongate member of metal or metal alloy of approximately U-shaped transverse cross-section is an extrudate of aluminium or aluminium-based alloy.

11. A method as claimed in claim 1, wherein the preformed elongate member of metal or metal alloy of approximately U-shaped transverse cross-section is a tape which has been preformed to approximately U-shaped transverse cross-section.

12. A method as claimed in claim 10 or 11, wherein, after the elongate member has been transversely folded to form the central core, the abutting longitudinal edges of the elongate member are welded together to close the elongate compartment.

13. A method as claimed in claim 1, wherein, before the layer of helically wound bare elongate elements of metal or metal alloy is applied to the central core, the central core is fed into the space bounded by another advancing preformed elongate member of metal or metal alloy of approximately U-shaped transverse cross-section and said other elongate member is transversely folded around the central core in such a way that its abutting longitudinally extending edges are circumferentially spaced with respect to the abutting longitudinally extending edges of the first elongate member.

14. A method as claimed in claim 1, wherein the interstices between the elongate elements of the layer are filled with a water-impermeable medium of a grease-like nature.

15. A method as claimed in claim 1, wherein the optical fibre is a component element of an optical bundle.

16. A method as claimed in claim 1, wherein the optical fibre is supported by a flexible elongate carrier member which is loosely housed in the elongate compartment so that the required limited relative movement between the optical fibre and the flexible stranded body can take place.

17. Apparatus for use in the manufacture of a flexible stranded body comprising a substantially circumferentially rigid central core of metal or metal alloy having an elongate compartment within and extending throughout the length of the core, at least one optical fibre loosely housed in, and of a length substantially greater than that of, the elongate compartment, and, surrounding the central core, at least one layer of helically wound bare elongate elements of metal or metal alloy, which apparatus comprises means for causing a preformed elongate member of metal or metal alloy of approximately U-shaped transverse cross-section to travel in the direction of its length; means for feeding into the space bounded by the U-shaped elongate member at least one optical fibre in such a way that the rate of advance of the fibre is restrained; means for transversely folding the advancing U-shaped elongate member in such a way as to form a substantially circumferentially rigid central core having a closed elongate compartment within and extending throughout the length of the core in which the advancing optical fibre is loosely housed; and means for injecting a water-impermeable medium of a grease-like nature into the elongate compartment under a controlled rate and pressure.

18. Apparatus as claimed in claim 17, which apparatus also includes means for applying around the central core at least one layer of helically wound bare elongate elements of metal or metal alloy.

19. Apparatus as claimed in claim 17 or 18, which apparatus also includes at least one substantially rigid tube which has an external diameter less than the internal diameter of the elongate compartment and which is positioned in the space bounded by the U-shaped elongate member and extends beyond the means for transversely folding the U-shaped elongate member to form the central core, the rigid tube having at least one port for injection of greasy water-impermeable medium.

* * * * *